US011363647B2

(12) United States Patent
Zhang et al.

(10) Patent No.: US 11,363,647 B2
(45) Date of Patent: *Jun. 14, 2022

(54) METHOD FOR CONTROLLING CONNECTION BETWEEN USER EQUIPMENT AND NETWORK, AND MOBILITY MANAGEMENT ENTITY

(71) Applicant: Huawei Device Co., Ltd., Shenzhen (CN)

(72) Inventors: Jun Zhang, Shenzhen (CN); Guodong Xue, Shenzhen (CN); Mianhong Dai, Shenzhen (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/524,812

(22) Filed: Jul. 29, 2019

(65) Prior Publication Data
US 2019/0357279 A1 Nov. 21, 2019

Related U.S. Application Data

(63) Continuation of application No. 15/495,578, filed on Apr. 24, 2017, now Pat. No. 10,412,771, which is a (Continued)

(30) Foreign Application Priority Data

Sep. 29, 2012 (CN) .......................... 201210370562.6

(51) Int. Cl.
*H04W 4/70* (2018.01)
*H04W 8/06* (2009.01)
(Continued)

(52) U.S. Cl.
CPC ............ *H04W 76/10* (2018.02); *H04W 4/70* (2018.02); *H04W 8/06* (2013.01); *H04W 48/06* (2013.01); *H04W 72/10* (2013.01); *H04W 76/18* (2018.02)

(58) Field of Classification Search
CPC ....... H04W 4/50–90; H04W 8/18–245; H04W 28/02–26; H04W 48/02–20;
(Continued)

(56) References Cited

U.S. PATENT DOCUMENTS 8,565,242 B2 10/2013 Wu et al.
8,625,506 B2 1/2014 Chin
(Continued)

FOREIGN PATENT DOCUMENTS

CN 101610494 A 12/2009
CN 102111847 A 6/2011
(Continued)

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 11)," 3GPP TS 23.401, V11.3.0, Technical Specification, Sep. 2012 (Year: 2012).*
(Continued)

*Primary Examiner* — Timothy J Weidner
(74) *Attorney, Agent, or Firm* — Conley Rose, P.C.

(57) ABSTRACT

A method for controlling a connection between a user equipment and a network includes receiving, by a MME, a network connection request sent by a user equipment. The method further includes determining a priority of the network connection request and a network overload state. The method further includes controlling a connection between the user equipment and a network according to the priority of the network connection request and the network overload state.

20 Claims, 6 Drawing Sheets

Related U.S. Application Data continuation of application No. 14/585,501, filed on Dec. 30, 2014, now Pat. No. 9,668,286, which is a continuation of application No. PCT/CN2013/072009, filed on Feb. 28, 2013.

(51) Int. Cl.
*H04W 48/06* (2009.01)
*H04W 72/10* (2009.01)
*H04W 76/10* (2018.01)
*H04W 76/18* (2018.01)

(58) Field of Classification Search
CPC ......... H04W 72/005–14; H04W 74/002–0891; H04W 76/10–50; H04W 84/02; H04W 84/04–045; H04W 84/18–22; H04W 88/08–188; H04W 92/04–14
See application file for complete search history.

(56) References Cited

U.S. PATENT DOCUMENTS

| | | | | |
|---|---|---|---|---|
| 9,668,286 B2* | 5/2017 | Zhang | ............ | H04W 76/10 |
| 10,412,771 B2* | 9/2019 | Zhang | ............ | H04W 76/10 |
| 2009/0209202 A1 | 8/2009 | Martini et al. | | |
| 2012/0063305 A1 | 3/2012 | Chiu et al. | | |
| 2012/0218889 A1 | 8/2012 | Watfa et al. | | |
| 2012/0294146 A1* | 11/2012 | Wu | ............ | H04W 72/10 |
| 2013/0044596 A1 | 2/2013 | Zhi et al. | | |
| 2013/0279330 A1 | 10/2013 | Feng et al. | | |
| 2015/0055494 A1 | 2/2015 | Xiaoji et al. | | |

FOREIGN PATENT DOCUMENTS

| | | | | |
|---|---|---|---|---|
| CN | 102256373 A | 11/2011 | | |
| CN | 102333343 A | 1/2012 | | |
| CN | 102547912 A | 7/2012 | | |
| EP | 2469944 A1 | 6/2012 | | |
| EP | 2555562 A1 | 2/2013 | | |
| EP | 2775754 A1 | 9/2014 | | |
| WO | WO-2011127710 A1 * | 10/2011 | ............ | H04W 72/10 |
| WO | 2011134378 A1 | 11/2011 | | |
| WO | 2012111993 A2 | 8/2012 | | |

OTHER PUBLICATIONS

Nokia, et al., "Analysis on sending the MTC Indicator to the network in Release 10," S2-105744, C1-104835, 3GPP TSG SA WG2 Meeting #82, Nov. 15-19, 2010, Jacksonville, Florida, USA, 4 pages.
Partial English Translation and Abstract of Chinese Patent Application No. CN101610494A, Part 1, Sep. 12, 2014, 43 pages.
Partial English Translation and Abstract of Chinese Patent Application No. CN101610494A, Part 2, Sep. 12, 2014, 11 pages.
"3rd Generation Partnership Project; Technical Specification Group Services and System Aspects; General Packet Radio Service (GPRS) enhancements for Evolved Universal Terrestrial Radio Access Network (E-UTRAN) access (Release 11)," 3GPP TS 23.401, V11.3.0, Technical Specification, Sep. 2012, 283 pages.
"3rd Generation Partnership Project; Technical Specification Group Services and System Aspects; System Improvements for Machine-Type Communications (Release 11)," XP050682693, 3GPP TR 23.888, V1.7.0, Technical Report, Aug. 2012, 165 pages.
"LS on M2M Dual Priority," 3GPP TSG CT WG1 Meeting #76, C1-120824, Feb. 6-10, 2012, 2 pages.
"Reply LS on the introduction of FULL-MOCN-GERAN feature," SA WG2 Meeting #S2-90, S2-121191, GP-120441, Apr. 16-20, 2012, 1 page.
"Reply LS on M2M Dual Priority," 3GPP TSG-SA WG2 Meeting #90, S2-121911, Apr. 10-16, 2012, 3 pages.
Foreign Communication From a Counterpart Application, Chinese Application No. 201210370562.6, Chinese Office Action dated Apr. 25, 2016, 4 pages.
Foreign Communication From a Counterpart Application, Chinese Application No. 201210370562.6, Chinese Search Report dated Apr. 14, 2016, 2 pages.
Foreign Communication From a Counterpart Application, Chinese Application No. 201210370562.6, Chinese Search Report dated Dec. 6, 2016, 2 pages.
Foreign Communication From a Counterpart Application, Chinese Application No. 201210370562.6, Chinese Office Action dated Dec. 15, 2016, 6 pages.
Foreign Communication From a Counterpart Application, European Application No. 13841822.3, Extended European Search Report dated Jul. 7, 2015, 11 pages.
Foreign Communication From a Counterpart Application, PCT Application No. PCT/CN2013/072009, English Translation of International Search Report dated Jul. 11, 2013, 2 pages.
Foreign Communication From a Counterpart Application, PCT Application No. PCT/CN2013/072009, Written Opinion dated Jul. 11, 2013, 6 pages.
Foreign Communication From a Counterpart Application, European Application No. 13841822.3, European Office Action dated Aug. 31, 2017, 8 pages.

* cited by examiner

METHOD FOR CONTROLLING CONNECTION BETWEEN USER EQUIPMENT AND NETWORK, AND MOBILITY MANAGEMENT ENTITY

CROSS-REFERENCE TO RELATED APPLICATION

This application is a continuation application of U.S. patent application Ser. No. 15/495,578, filed on Apr. 24, 2017. The U.S. patent application Ser. No. 15/495,578 is a continuation application of U.S. patent application Ser. No. 14/585,501, filed on Dec. 30, 2014, which is a continuation of International Patent Application No. PCT/CN2013/072009, filed on Feb. 28, 2013, which claims priority to Chinese Patent Application No. 201210370562.6, filed on Sep. 29, 2012. All of the aforementioned patent applications are hereby incorporated by reference in their entireties.

TECHNICAL FIELD

The present disclosure relates to the field of communications, and in particular, to a method for controlling a connection between a user equipment and a network and a mobility management entity (MME) for controlling a connection between a user equipment and a network.

BACKGROUND

With the development of 3rd-generation mobile communications (3G) technologies, application in machine-to-machine (M2M) communications becomes extensive. A corresponding name of M2M in a 3rd Generation Partnership Project (3GPP) system is machine type communications (MTC), which is a short name of M2M communications. The M2M communications is applied to various communications networks, such as the Internet, an industry network, and a communications network. Technologies of M2M and machine-to-mobile phone data communication and interaction are implemented by sensing and processing application information of devices for M2M communications. M2M communications extends a communication range of an existing information and communications network, and by deploying M2M devices having sensing and processing capabilities, information transmission, collaboration, and processing are implemented by means of network facilities such that various applications such as logistics management, electricity meter reading, and security and health monitoring may conveniently acquire various required information.

An M2M device does not have a high requirement for real-time quality such that a single network connection having a low priority is usually established between the M2M device and a network, and a connection between a user equipment and the network cannot be selectively controlled according to an emergency state of actual service data.

SUMMARY

Embodiments of the present disclosure provide a method for controlling a connection between a user equipment and a network, and an MME, which can selectively control a connection between a user equipment and a network according to an emergency state of service data.

According to a first aspect, a method for controlling a connection between a user equipment and a network is provided, and includes receiving, by an MME, a network connection request sent by a user equipment, determining, by the MME, a priority of the network connection request and a network overload state, and controlling, by the MME, a connection between the user equipment and a network according to the priority of the network connection request and the network overload state.

In a first possible implementation manner of the first aspect, controlling, by the MME, a connection between the user equipment and a network according to the priority of the network connection request and the network overload state includes rejecting, by the MME, a network connection request having a low priority according to that the priority of the connection request is the low priority and the network is overloaded, and sending, to the user equipment, a rejecting message carrying a back-off time.

With reference to the first possible implementation manner of the first aspect, in a second possible implementation manner, after sending, by the MME to the user equipment, a rejecting message carrying a back-off time, the method further includes receiving, by the MME in the back-off time, a second network connection request sent by the user equipment, and when the MME determines that a priority of the second network connection request is a non-low priority, sending a timing stop instruction to the user equipment, and controlling establishment of a connection having a non-low priority between the user equipment and the network.

In a third possible implementation manner of the first aspect, controlling, by the MME, a connection between the user equipment and a network according to the priority of the network connection request and the network overload state includes controlling establishment of a connection having a corresponding priority between the user equipment and the network when the MME determines that the priority of the connection request is a low priority or a non-low priority, and determines that the network is not overloaded.

With reference to the second possible implementation manner or the third possible implementation manner of the first aspect, in a fourth possible implementation manner, controlling, by the MME, establishment of a connection having a non-low priority between the user equipment and the network includes controlling establishment of a bearer having a non-low priority or a packet data network (PDN) connection having a non-low priority between the user equipment and the network when the MME determines, according to subscription information of the user equipment, that the user equipment does not belong to a preset user equipment group.

With reference to the second possible implementation manner or the third possible implementation manner of the first aspect, in a fifth possible implementation manner, controlling a connection between the user equipment and the network includes controlling establishment of a public bearer having a non-low priority or a public PDN connection having a non-low priority between the user equipment and the network when the MME determines, according to subscription information of the user equipment, that the user equipment belongs to a preset user equipment group.

With reference to the first aspect or any one of the foregoing possible implementation manners, in a sixth possible implementation manner, controlling a connection between the user equipment and a network according to the priority of the network connection request and the network overload state includes rejecting the connection request having a non-low priority sent by the user equipment when the MME determines that the priority of the network connection request is a non-low priority, and determines that the number of user equipment having established connections having a non-low priority to the network exceeds a limit value.

With reference to the first aspect or any one of the foregoing possible implementation manners, in a seventh possible implementation manner, determining, by the MME, a priority of the network connection request includes determining the priority of the network connection request according to the priority information when the MME determines that the network connection request carries priority information.

With reference to the seventh possible implementation manner of the first aspect, in an eighth possible implementation manner, determining the priority of the network connection request according to the priority information includes determining, by the MME, the priority of the network connection request according to a correspondence between an access point name (APN) and a priority in the priority information.

With reference to any one of the first to seventh possible implementation manners of the first aspect, in a ninth possible implementation manner, determining, by the MME, a priority of the network connection request includes determining that the priority of the network connection request is a non-low priority when the MME determines that the network connection request does not carry priority information.

With reference to the first aspect or any one of the foregoing possible implementation manners, in a tenth possible implementation manner, determining, by the MME, a network overload state includes determining, by the MME, the network overload state according to an idle state of network resources, and/or determining, by the MME, the network overload state according to a network overload control command.

According to a second aspect, an MME is provided, and includes a transmission module, a determining module, and a control module, where the transmission module receives a network connection request sent by a user equipment, the determining module determines a priority of the network connection request and a network overload state, and the control module controls a connection between the user equipment and a network according to the priority of the network connection request and the network overload state.

In a first possible implementation manner of the second aspect, the control module controlling a connection between the user equipment and a network according to the priority of the network connection request and the network overload state includes that the control module rejects a network connection request having a low priority according to that the priority of the connection request is the low priority and the network is overloaded, and sends, to the user equipment, a rejecting message carrying a back-off time.

With reference to the first possible implementation manner of the second aspect, in a second possible implementation manner, after the control module sends, to the user equipment, a rejecting message carrying the back-off time, the control module receives, in the back-off time, a second network connection request sent by the user equipment, and the control module sends a timing stop instruction to the user equipment, and controls establishment of a connection having non-low priority between the user equipment and the network when the control module determines that a priority of the second network connection request is a non-low priority.

According to a third aspect, a user equipment is provided, and includes a transmission module, a timing module, and a control module, where the transmission module sends a network connection request to an MME, the transmission module receives a rejecting message which carries a back-off time and is sent by the MME, the timing module starts a timer according to the back-off time in the rejecting message, and the control module, in the back-off time, forbids the user equipment to send a network connection request having a low priority, and allows the user equipment to send a network connection request having a non-low priority to the MME.

In a first possible implementation manner of the third aspect, the network connection request carries priority information, or does not carry priority information.

With reference to the third aspect or the first possible implementation manner of the third aspect, in a second possible implementation manner, the control module allowing, in the back-off time, the network connection request having a non-low priority to be sent to the MME includes that the control module controls, in the back-off time, the user equipment to send the network connection request having a non-low priority to the MME when the user equipment acquires service data having a non-low priority.

With reference to the second possible implementation manner of the third aspect, in a third possible implementation manner, after the control module controls the user equipment to send the network connection request having a non-low priority to the MME, the control module stops timing of the timer according to timing stop signaling sent for the network connection request having a non-low priority by the MME.

According to the embodiments of the present disclosure, the MME may selectively control the connection between the user equipment and the network by determining the priority of the network connection request and the network overload state.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be understood that, communication between M2M devices according to the embodiments of the present disclosure may be applied to various communications systems, for example, a Global System for Mobile Communications (GSM) system, a Code Division Multiple Access (CDMA) system, a Wideband CDMA (WCDMA) system, a General Packet Radio Service (GPRS) system, a Long Term Evolution (LTE) system, an Advanced LTE (LTE-A) system, and a Universal Mobile Telecommunications System (UMTS), which are not limited in the embodiments of the present disclosure.

Figure 1:
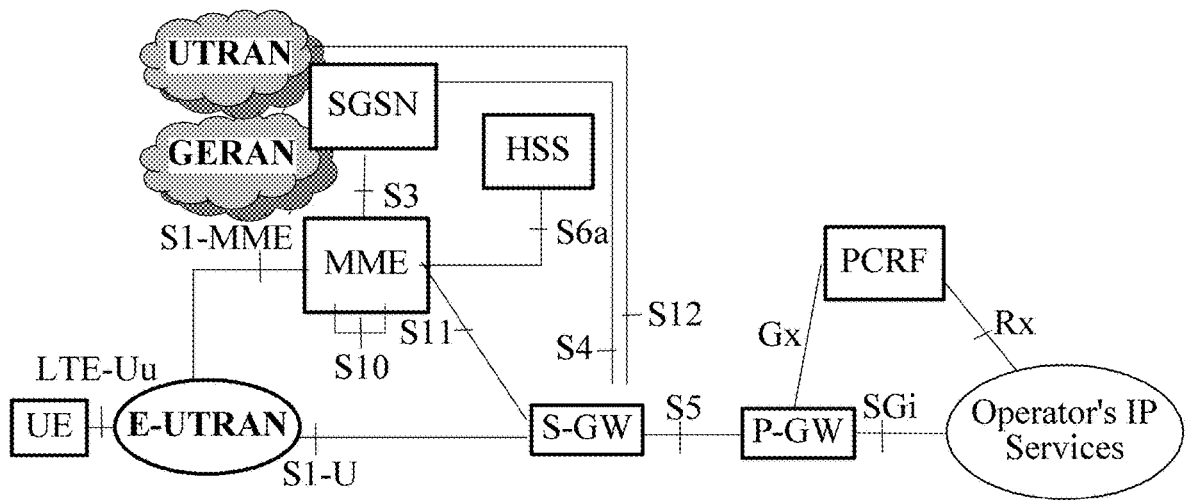
FIG. 1 is an application scenario diagram of a communications system according to a first embodiment of the present disclosure, where an MME controls a connection between a user equipment and a network.

FIG. 1 is an application scenario diagram of a communications system according to a first embodiment of the present disclosure, where a connection between a user equipment and a network is controlled.

As shown in FIG. 1, the communications system according to the embodiment of the present disclosure is described using an evolved packet system (EPS) applied to the 3GPP as an example. The EPS includes an Evolved Universal Terrestrial Radio Access Network (E-UTRAN), an MME, a serving gateway (S-GW), a PDN gateway (P-GW), a home subscriber server (HSS), a 3GPP authentication, authorization and accounting (AAA) server, a policy and charging rules function (PCRF) and other support nodes.

The MME is responsible for functions, such as mobility management, processing of non-access-stratum (NAS) signaling, control plane related operations such as management of a user mobility context, reachability management for a mobile terminal in an idle state selected by the P-GW and the S-GW, and selecting of a tracking area list.

The S-GW is an access gateway device and is connected to the E-UTRAN, and functions of the S-GW include serving as a local anchor point switching between evolved nodeBs (eNodeB), forwarding data between the E-UTRAN and the P-GW, being responsible for caching paging waiting data, lawful interception, data packet routing, and inter-operator accounting based on a user and a quality of service (QoS) class identifier (QCI).

The P-GW is a border gateway between the EPS and a PDN, and functions of the P-GW include packet filtering, lawful interception, mobile terminal address allocating, and transport layer packet QoS tag that are user-based, service-based uplink and downlink accounting, downlink rate guarantee based on an aggregate maximum bite rate (AMBR), Dynamic Host Configuration Protocol version 4/6 (DHCP v4/v6), and downlink rate guarantee for a cumulative maximum bit rate (MBR) based on a same guaranteed bit rate (GBR) QCI. In addition, the P-GW is further responsible for binding uplink and downlink bearers.

The EPS supports interworking with a non-3GPP system, and the P-GW is used as an anchor point between the 3GPP system and the non-3GPP system.

The user equipment in the embodiment of the present disclosure may be an M2M device, for example, a fixed or mobile M2M communications device such as a temperature tester, or a water/electricity meter.

The MME in the embodiment of the present disclosure controls a connection between a user equipment and a network according to a network connection request of the user equipment, and a specific technical solution is described in the following.

Figure 2:
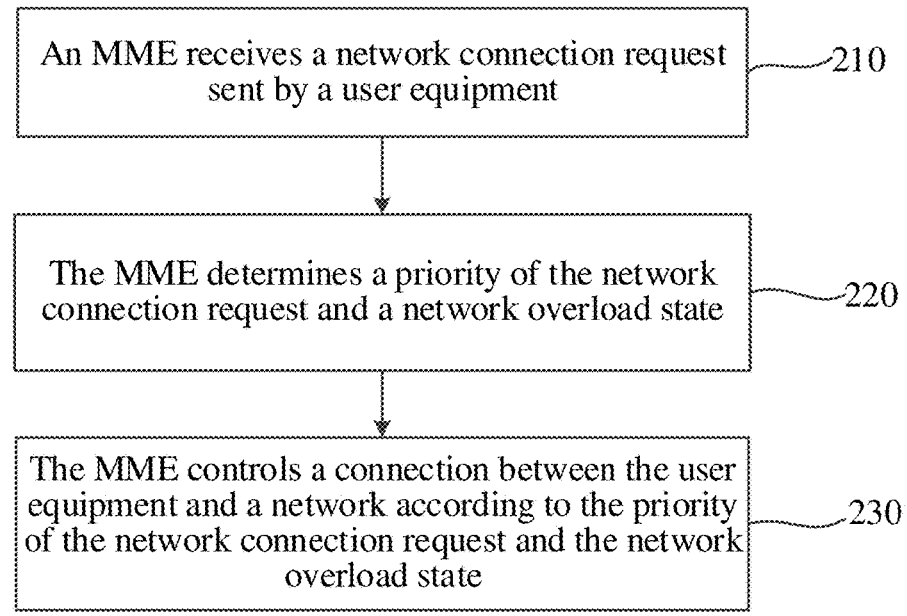
FIG. 2 is a schematic flowchart diagram of a method used by the MME to control the connection between the user equipment and the network according to the first embodiment of the present disclosure in FIG. 1.

FIG. 2 is a schematic flowchart diagram of a method used by the MME to control the connection between the user equipment and the network according to the first embodiment of the present disclosure in FIG. 1.

Step 210: An MME receives a network connection request sent by a user equipment.

Step 220: The MME determines a priority of the network connection request and a network overload state.

The MME determining a priority of the network connection request includes that the MME determines whether the network connection request carries priority information. The priority of the network connection request is determined according to priority information if the priority information is carried, and the priority of the network connection request is a non-low priority if the priority information is not carried.

Figure 3:
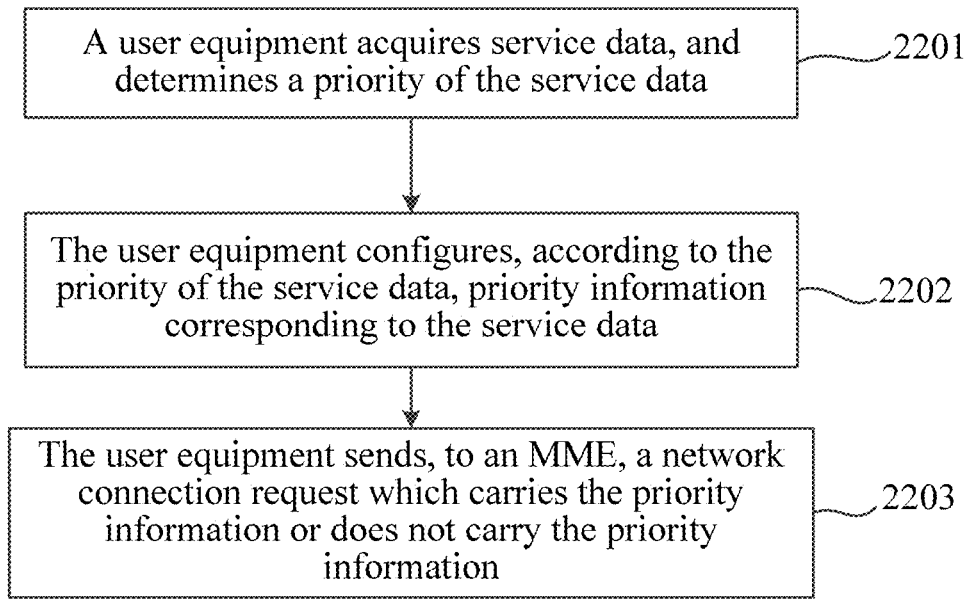
FIG. 3 is a schematic flowchart diagram of a method for configuring priority information according to the first embodiment of the present disclosure.

The priority information is preconfigured in the user equipment. Referring to FIG. 3, FIG. 3 is a schematic flowchart diagram of a method used by the user equipment to configure a priority.

The method used by the user equipment to configure the priority information includes the following steps.

Step 2201: The user equipment acquires service data, and determines a priority of the service data.

It can be understood that, the service data may be meter reading data of a water/electricity meter, temperature/humidity data of a temperature/humidity detector, or the like.

In this embodiment, the priority of the service data includes at least two types of priorities. An example in which priorities of the service data are a low priority and a non-low priority is used. For example, a priority of normal service data corresponds to service data having a low priority, and a priority of abnormal service data may be corresponding to service data having a non-low priority.

Further, the user equipment acquires the service data, determines whether a numerical value of the acquired service data exceeds a threshold. it is defined that the priority of the service data is a low priority if the numerical value does not exceed the threshold, and it is defined that the priority of the service data is a non-low priority if the numerical value exceeds the threshold.

For example, the service data is temperature monitoring data of device, and the threshold is predetermined as 40 degrees. If temperature data acquired by the user equipment exceeds 40 degrees the temperature data is abnormal service data, and it is defined that the priority of the abnormal service data is a non-low priority, and if the temperature does not exceed 40 degrees the temperature data is normal service data, and it is defined that the priority of the normal service data is a low priority.

It can be understood that, a threshold preset by the user equipment may also be a predetermined range. Further, the user equipment determines whether the numerical value of the acquired service data falls within the predetermined range, and if the numerical value of the acquired service data falls within the predetermined range, the priority of the service data is a low priority. Otherwise the priority of the service data is a non-low priority. In the embodiment of the present disclosure, a division manner of the threshold is not limited thereto, and other division manners which can clearly indicate a priority range of the service data are all applicable to the embodiment of the present disclosure.

It can be understood that, the priority of the service data may also include a low priority and a non-low priority, where the non-low priority may further include a medium priority and a high priority. For setting a priority level, multiple levels may be set according to actual needs. The priority in the embodiment of the present disclosure is not limited to the low priority and the non-low priority, and the two types of priorities are merely used as an example for description.

Step 2202: The user equipment configures, according to the priority of the service data, the priority information corresponding to the service data.

Further, an example in which the priority of the service data has a dual priority is used. The user equipment may newly add a priority parameter in advance in an attribute of the user equipment according to a user operation. In this embodiment, after the user equipment acquires the service data, the newly added priority parameter is searched for in attribute information of the user equipment, and a parameter value corresponding to the priority is configured according to the priority of the service data. As shown in Table 1, for example, if the parameter value is 11, 1 in the tens digit place indicates that the service data is service data having a dual priority, and 1 in the ones digit place indicates the priority of the service data is a non-low priority. If the parameter value is 10, 1 in the tens digit place indicates that the service data is service data having a dual priority, and 0 in the ones digit place indicates that the priority of the service data is a low priority.

TABLE 1

| Newly added priority parameter | Parameter value | Descriptions |
|---|---|---|
| Dual Priority | 11 | Non-low priority of a dual priority |
| Dual Priority | 10 | Low priority of a dual priority |

Optionally, an M2M device may also add the priority information of the service data in a reserved bit of sent NAS signaling. Corresponding numerical values are set in different idle bits to indicate the priority of the service data. For a method for setting the priority, refer to Table 2 and Table 3. The NAS signaling may be the network connection request carrying the priority information, and the priority of the service data corresponds to the priority of the network connection request.

TABLE 2

| 8 | 7 | 6 | 5 | 4 | 3 | 2 | 1 |
|---|---|---|---|---|---|---|---|
| Attribute information bits | | | | 0 Idle bit | 0 Idle bit | 1 Idle bit | 1 Idle bit |

TABLE 3

| 8 | 7 | 6 | 5 | 4 | 3 | 2 | 1 |
|---|---|---|---|---|---|---|---|
| Attribute information bits | | | | 0 Idle bit | 0 Idle bit | 1 Idle bit | 0 Idle bit |

As shown in Table 2 and Table 3, for example, the attribute information of the user equipment is an 8-bit binary number, where the $5^{th}$ to $8^{th}$ bits in the 8 bits are used for indicating the attribute information, and the $1^{st}$ to $4^{th}$ bits are idle bits. In the embodiment of the present disclosure, in the $1^{st}$ to $4^{th}$ bits, the $1^{st}$ idle bit may be set as the numerical value 1, the $2^{nd}$ idle bit may be set as the numerical value 1, the other idle bits are 0, and 0011, such as in Table 2 indicates that the service data has a characteristic of a dual priority, and the priority of the service data is a non-low priority, or the $1^{st}$ idle bit in the $1^{st}$ to $4^{th}$ bits is set as the numerical value 0, the $2^{nd}$ idle bit is set as a numerical value 1, the other idle bits are 0, and 0010, such as in Table 3 indicates that the service data has a characteristic of a dual priority, and the priority of the service data is a low priority.

It can be understood that, a manner of setting a priority indication in idle bits of the attribute information is not limited thereto, and may include multiple permutations and combinations to indicate the priority information. For example, both 1000 and 1100 indicate that the service data has a characteristic of a dual priority, and priorities of the service data are a low priority and a non-low priority separately.

It can be further understood that, the priority information may also merely indicate a priority of acquired service data. For example, in Table 1, the parameter value 11 indicates that the priority of the service data is a non-low priority, and the parameter value 10 indicates that the priority of the service data is a low priority. In Table 2 to Table 3, the reserved bit value 0010 of an attribute information of the user equipment indicates that the priority of the service data is a low priority, and 0011 indicates that the priority of the service data is a non-low priority.

Step 2203: The user equipment sends, to the MME, a network connection request which carries the priority information or does not carry the priority information.

In this embodiment, a type of the network connection request initiated by the user equipment to the MME may be an attach connection request, a PDN connection request, a mobility management message, a session management message, or the like. The connection request may carry a user equipment identifier, priority information, and/or a user equipment group identifier.

When the user equipment is used for the first time, the network connection request sent by the user equipment to the MME is an attach connection request, and the MME may control establishment of an attach process according to a priority of the attach connection request and the network overload state.

When the user equipment is not used for the first time, that is, the user equipment completes an attach process having a low priority with a network and establishes a connection having a low priority to the network, when the network is overloaded, the MME rejects a connection request having a low priority of the user equipment. If the user equipment needs to send service data having a non-low priority, the user equipment needs to establish a network connection having a non-low priority such that the user equipment may send, to the MME, a PDN connection request carrying non-low priority information, and establish the connection having a non-low priority between the user equipment and the network by means of the PDN connection request. When the connection request sent by the user equipment to the MME is a PDN connection request carrying low priority information, the MME may control, according to a priority of the PDN connection request and the network overload state, the user equipment to establish the connection having a non-low priority to the network.

Optionally or further, that the MME determining the network overload state includes that the MME may determine the network overload state according to an idle state of network resources. For example, if the MME determines that an idle network resource exists, the MME determines that the network is not overloaded, if the MME determines that no idle network resource exists, the MME determines that the network is overloaded.

Optionally, the MME may determine the network overload state according to a network overload control command.

For example, the MME determines that the network is overloaded if the MME determines that the network overload control command is received, and the MME determines that the network is not overloaded if the MME determines that no network overload control command is received.

It can be understood that, the network overload control command can be triggered when a device operator or manufacturer maintains a device or be triggered when a device is faulty.

Step 230: The MME controls a connection between the user equipment and the network according to the priority of the network connection request and the network overload state.

The MME rejects the network connection request of the user equipment according to that the priority of the network connection request is a low priority and the network is overloaded, and sends a back-off timer to the user equipment.

Figure 4:
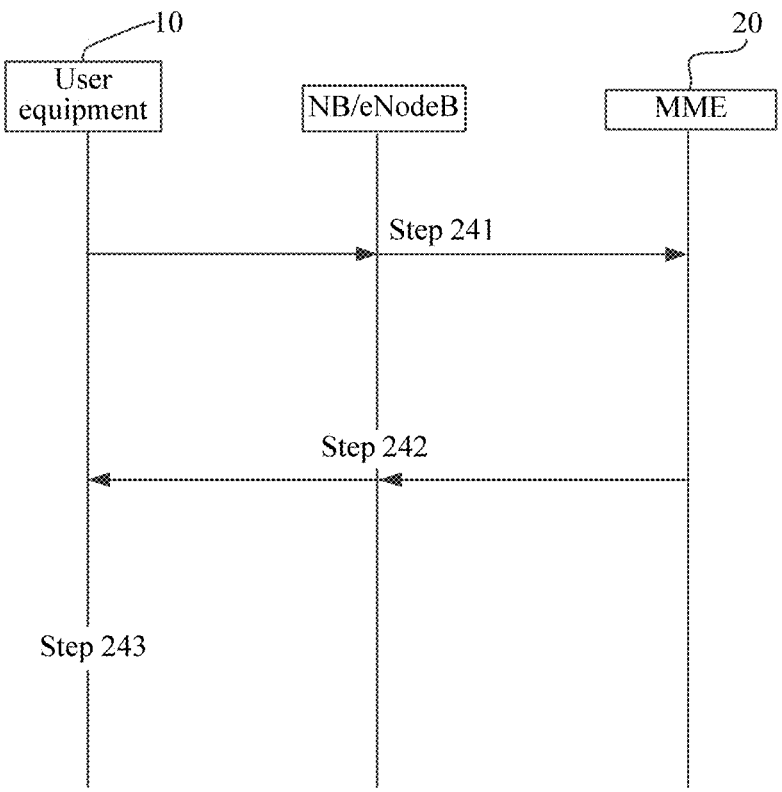
FIG. 4 is a schematic flowchart diagram of a process in which the MME rejects a network connection request of the user equipment according to the first embodiment of the present disclosure.

For example, as shown in FIG. 4, FIG. 4 is a schematic diagram of a process in which an MME 20 rejects the network connection request of a user equipment 10, where the MME 20 and the user equipment 10 communicate through the node B or e Node B.

Step 241: The MME 20 receives the network connection request sent by the user equipment 10.

Step 242: If the MME 20 determines that the priority of the network connection request is a low priority, and determines that the network is overloaded, the MME 20 rejects the connection request having a low priority, and sends, to the user equipment 10, a rejecting message carrying a back-off time.

Step 243: The MME 20 does not receive, in the back-off time, any network connection request having a low priority sent by the user equipment 10.

Optionally, the user equipment 10 may activate, according to the rejecting message, the back-off timer to start timing, and the user equipment 10 no longer sends any connection request having a low priority to the MME 20 in the back-off time.

In this embodiment, under the circumstance that the network is overloaded, the MME 20 rejects the network connection request having a low priority sent by the user equipment 10, which can save network resources and protect establishment of a network connection having a non-low priority.

Optionally, when the MME 20 determines that the priority of the network connection request is a low priority or a non-low priority, and determines that the network is not overloaded, the MME 20 controls the user equipment 10 to establish a network connection having a low priority or a non-low priority.

Optionally, when the MME 20 determines that the priority of the network connection request is a low priority, and determines that the network is overloaded, the MME 20 rejects the network connection request having a low priority, and after the rejecting message carrying the back-off time is sent to the user equipment 10, the MME 20 receives, in the back-off time, a second network connection request sent by the user equipment 10. If the MME 20 determines that a priority of the second network connection request is a non-low priority, the MME 20 sends a timing stop message to the user equipment 10, and controls the user equipment 10 to establish the connection having a non-low priority to the network.

A process of establishing a network connection having a non-low priority is used below as an example for description.

Figure 5:
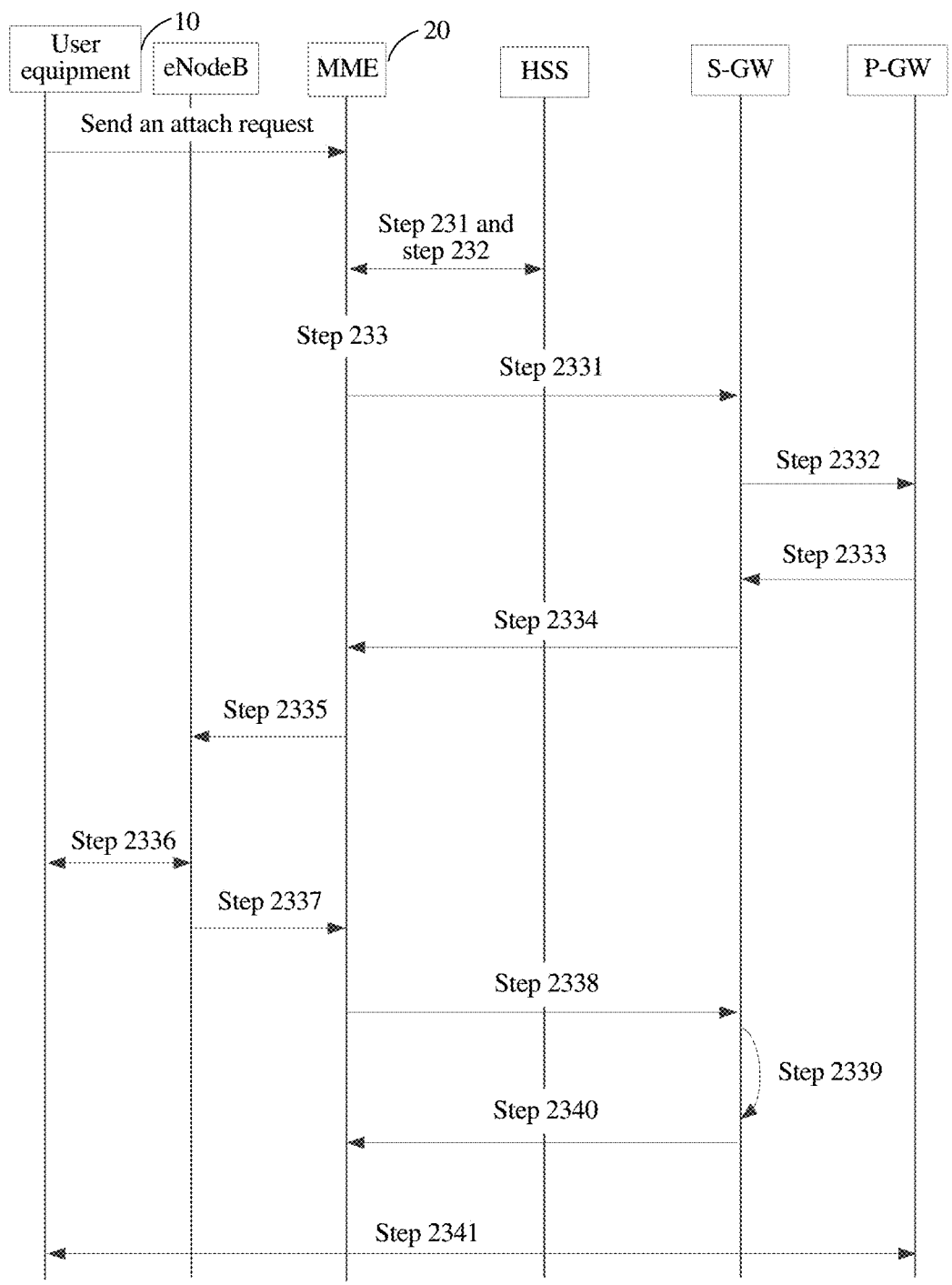
FIG. 5 is a schematic flowchart diagram of a process in which the MME controls a preset user equipment group to establish a connection having a non-low priority to a network according to the first embodiment of the present disclosure.

FIG. 5 is a schematic diagram of a process in which the MME 20 controls the user equipment 10 to establish a connection having a non-low priority to the network according to the first embodiment of the present disclosure.

The MME 20 controls the user equipment 10 to establish a network connection having a non-low priority when the network connection request is an attach request, and a priority of the attach request is a non-low priority. Further, step 231 is performed.

When the user equipment 10 has already established a bearer having a low priority to a network, and when the user equipment 10 needs to send service data having a non-low priority, the bearer having a low priority cannot implement transmission of the service data having a non-low priority. Then the user equipment 10 establishes a network connection having a non-low priority by sending a PDN connection request having a non-low priority. Further, step 233 is performed, where the attach request or the PDN connection request carries an identifier, and/or priority information, and/or a group identifier of the user equipment 10.

Step 231: The MME 20 sends a location update request to an HSS according to the network connection request.

Step 232: The HSS, in response to the location update request, sends subscription data of the user equipment 10 to the MME 20, where the subscription data includes subscription information, such as a subscription group identifier of the user equipment 10.

Step 233: If the MME 20 determines, according to the subscription information, that the user equipment 10 belongs to a preset user equipment group, the MME 20 establishes a public bearer having a non-low priority or a public PDN connection having a non-low priority for a user equipment in the preset user equipment group according to a trigger request of the user equipment 10 such that other user equipment in the preset user equipment group may use the public bearer or public PDN connection to perform data transmission.

Step 2331: The MME 20 sends a create session request message to an S-GW, where the request message carries public bearer information, such as the group identifier and a public bearer identifier.

Step 2332: The S-GW sends the create session request message to a P-GW, where the request message carries the public bearer information, such as the group identifier and the public bearer identifier.

It can be understood that, the S-GW determines whether a public bearer has been established for the user equipment group, and if the public bearer has been established, step 2334 is performed. Otherwise, a create session request is sent to the P-GW.

Step 2333: The P-GW generates an accounting identifier for the public bearer, and sends a create session response message to the S-GW, where the response message carries a public bearer resource, such as a public bearer identifier.

Step 2334: The S-GW sends the create session response message to the MME 20, where the response message carries a public bearer resource, such as the public bearer identifier.

Step 2335: The MME 20 sends an attach accept message or a PDN connection accept message to a base station eNodeB, where the accept message carries public bearer information, such as the public bearer identifier.

Step 2336: The base station eNodeB and the user equipment 10 complete a radio resource control (RRC) protocol connection reallocation process, and establish a radio access bearer.

Step 2337: The base station eNodeB sends an attach complete message or a PDN connection complete message to the MME 20, where the message carries a public bearer resource, such as the public bearer identifier, an eNodeB address, and an identifier TEID.

Step 2338: The MME 20 sends a modify bearer request message to the S-GW, where the message carries a public bearer resource, such as the public bearer identifier, the eNodeB address, and a channel port identifier (TEID).

Step 2339: The S-GW creates a mapping between the public bearer and the access bearer.

For example, a mapping among an identifier of the user equipment 10 or an IP address of the user equipment 10, a group identifier, a public bearer identifier, an eNodeB TEID, a S-GW TEID and so on is established.

Step 2340: The S-GW sends a modify bearer response message to the MME 20.

Step 2341: The user equipment 10 of the preset user equipment group sends or receives data by means of the public bearer.

For example, when the user equipment 10 of the preset user equipment group sends the data, an uplink data packet is sent to the S-GW by means of the access bearer, then the S-GW finds a corresponding S-GW TEID or public bearer identifier according to the identifier or IP address or group identifier of the user equipment 10, forwards the data to a corresponding public bearer port, and sends the data to the P-GW by means of the public bearer port. The public bearer and a default bearer having a non-low priority may transmit service data having a non-low priority, and may also transmit service data having a low priority. Each user equipment 10 belonging to the preset user equipment group may transmit the service data by means of the public bearer.

In this embodiment, the MME 20 controls the preset user equipment group to establish a public bearer or a public PDN connection such that the user equipment 10 belonging to the preset user equipment group may transmit service data having a low priority or a non-low priority by means of the public bearer, or transmit service data having a non-low priority by means of the public PDN connection, which avoids repeatedly establishing a respective bearer or PDN connection for each user equipment 10 belonging to the preset user equipment group, thereby saving network resources.

Optionally, in step 233, if the MME 20 determines, according to the subscription information of the user equipment 10, that the user equipment 10 does not belong to the preset user equipment group, the MME 20 controls the single user equipment 10 to establish a bearer having a non-low priority or a PDN connection having a non-low priority.

Figure 6:
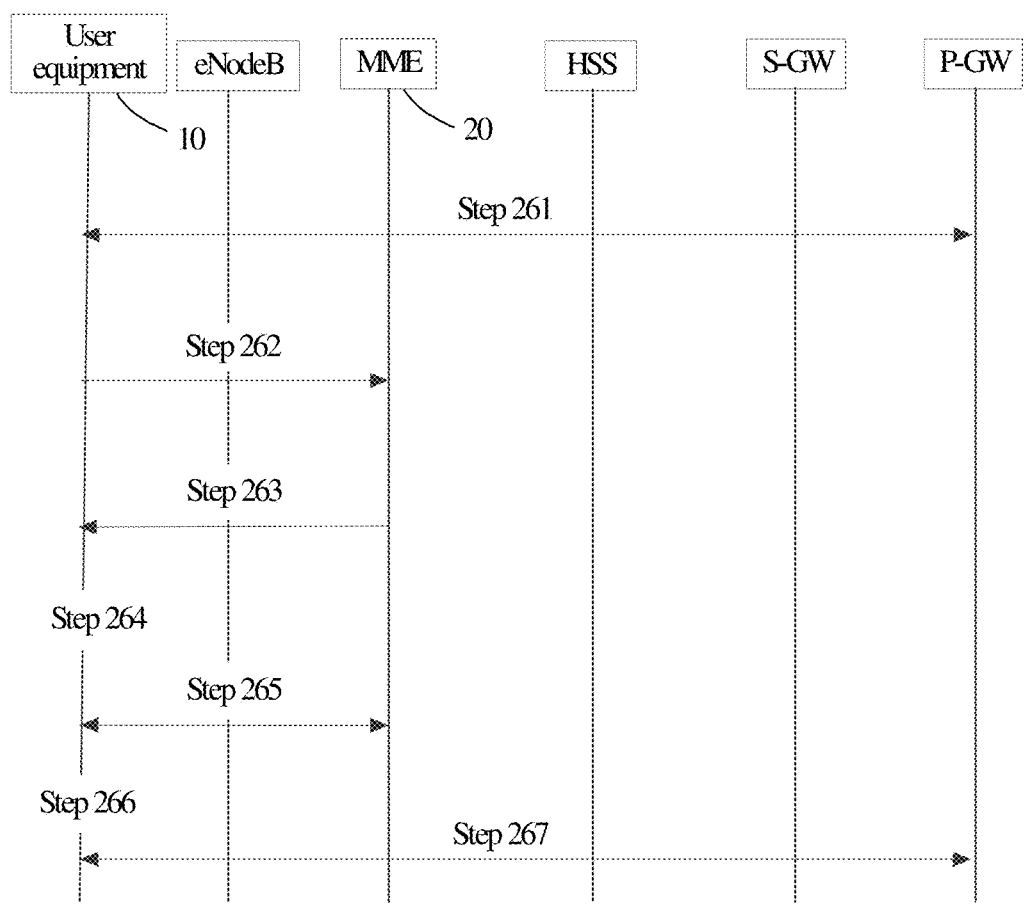
FIG. 6 is a schematic flowchart diagram of controlling a single user equipment to establish a PDN connection having a non-low priority to a network by the MME according to the first embodiment of the present disclosure.

FIG. 6 is a schematic diagram of controlling the single user equipment 10 to establish a connection having a non-low priority to a network by the MME 20 according to the first embodiment of the present disclosure. A process of establishing a network connection having a non-low priority is described using an example in which the network connection having a non-low priority is established after a network connection having a low priority is established between the user equipment 10 and the network.

Step 261: The user equipment 10 is attached to the network to establish a bearer having a low priority.

Step 262: The user equipment 10 sends a service data transmission request having a low priority.

Step 263: The MME 20 determines that a priority of the transmission request is a low priority, and if the network is overloaded, the MME 20 refuses to receive the request of the user equipment 10, and sends, to the user equipment 10, a rejecting message carrying a back-off time, if the network is not overloaded, step 267 is performed.

Step 264: The user equipment 10 starts timing of a back-off timer according to the back-off time in the rejecting message, and does not send a connection request having a low priority within a timing time.

Step 265: The MME 20 receives a PDN connection request having a non-low priority of the user equipment 10, and sends a timing stop command to the user equipment 10.

Step 266: The user equipment 10 stops timing of the back-off timer according to the timing stop command, and allows the user equipment 10 to send a network connection request having a low priority.

Step 267: The MME 20 controls establishment of the PDN connection having a non-low priority between the user equipment 10 and the network according to the PDN connection request having a non-low priority.

It can be understood that, the single user equipment 10 may also send an attach request having a non-low priority to the MME 20, and if the MME 20 determines that a priority of the attach request is a non-low priority, the MME 20 accepts the attach request, and establishes a network connection having a non-low priority for the user equipment 10.

It can be understood that, the process in which the single user equipment 10 establishes the network connection having a non-low priority or a low priority to the network is similar to the foregoing process in which the preset user equipment group establishes a public bearer or a public PDN connection to the network, which is not described herein again.

It can be understood that, if the user equipment 10 supports multiple PDN connections, the priority information may further include different APNs. The MME 20 identifies connection requests having different priorities according to different APN values. For example, APN1 indicates a connection request having a low priority, and APN2 indicates a connection request having a non-low priority. The MME 20 may determine a priority of a connection request according to the APN value.

It can be understood that, for the user equipment 10 supporting a single PDN connection, an existing PDN connection needs to be deleted and a new PDN connection needs to be established before a new PDN connection request is initiated. A specific process in which the PDN connection is deleted is a technology known by a person skilled in the art, does not affect clear descriptions of the main technical solution in the embodiment of the present disclosure, and is not described herein again.

It can be understood that, the MME 20 may also predefine a limit value for the user equipment 10 that may establish a network connection having a non-low priority. When the MME 20 determines that the number of user equipment 10 having established the network connections having a non-low priority exceeds the limit value, whether the network is overloaded or not, the MME 20 rejects the connection request having a non-low priority sent by the user equipment 10.

It can be further understood that, for the user equipment 10 belonging to the preset user equipment group, the MME 20 may further set a limit value for the number of user equipment belonging to the preset user equipment group and establishing connections having a non-low priority to the network. The MME 20 rejects the connection request having a non-low priority sent by the user equipment 10 when the MME 20 determines that the number of the user equipment establishing connections having a non-low priority to the network and in the preset user equipment group exceeds the limit value. The MME 20 protects the network by controlling the number of the user equipment establishing network connections, which avoids network paralysis caused by occupancy of network resources by multiple user equipment unlimitedly establishing network connections having a non-low priority.

It can be further understood that, an order in which the MME 20 determines the priority of the network connection request and determines the network overload state is not limited.

In this embodiment of the present disclosure, the MME 20 may selectively control the connection between the user equipment 10 and the network by determining the priority of the network connection request and the network overload state.

Figure 7:
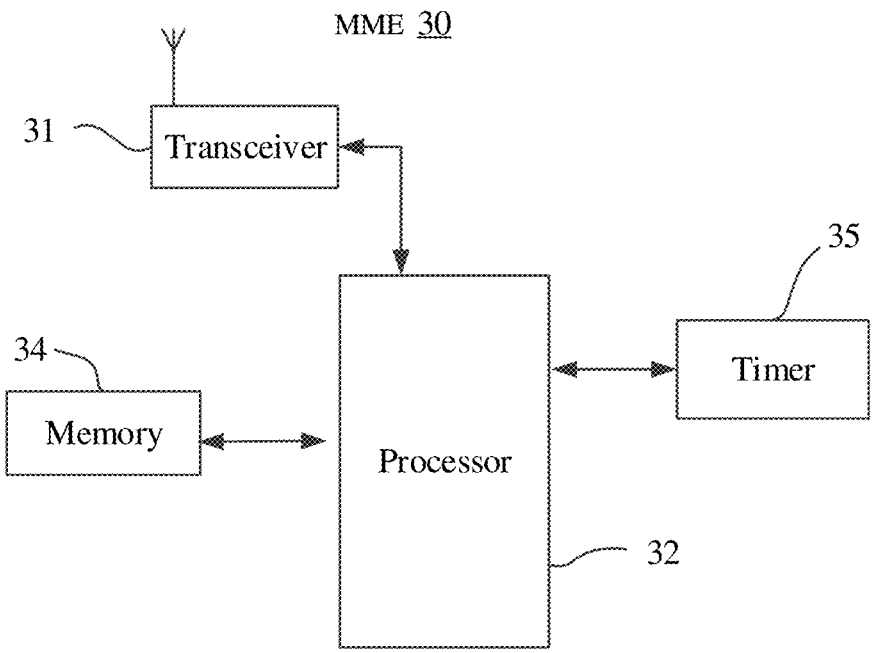
FIG. 7 is a schematic structural diagram of an MME that controls a connection between a user equipment and a network according to a second embodiment of the present disclosure.

According to the descriptions of the foregoing embodiment, FIG. 7 is a schematic structural diagram of an MME 30 that controls a connection between a user equipment and a network according to a second embodiment of the present disclosure.

Based on the first embodiment of the present disclosure, the MME 30 may be applied to a 3GPP EPS, and the EPS includes an E-UTRAN, an MME, an S-GW, a P-GW, an HSS, a 3GPP AAA server, a PCRF and other support nodes. The MME 30 is responsible for functions, such as mobility management, processing of NAS signaling, control plane related operations such as management of a user mobility context, reachability management for a mobile terminal in an idle state selected by the P-GW and the S-GW, and selecting of a tracking area list.

The MME 30 includes a transceiver 31 and a processor 32. The transceiver 31 receives a network connection request sent by a user equipment. The processor 32 determines a priority of the network connection request and a network overload state, and further controls a connection between the user equipment and a network according to the priority of the network connection request and the network overload state.

In this embodiment of the present disclosure, the MME 30 may selectively control the connection between the user equipment and the network by determining the priority of the network connection request and the network overload state.

The transceiver 31 is configured to receive and send information in an information receiving and sending process or a call process, and the transceiver 31 may communicate with other devices using a wireless communications system and the network. According to the embodiment of the present disclosure, the transceiver 31 receives the network connection request sent by the user equipment, and sends, according to the priority of the network connection request and the network overload state, information about controlling establishment of the connection between the user equipment and the network.

The processor 32 determining the priority of the network connection request includes that the processor 32 determines whether priority information is carried in the network connection request, and if priority information is carried, the priority of the network connection request is determined according to the priority information. If the priority information is not carried, it is determined that the priority of the network connection request is a non-low priority.

The priority information is preconfigured in the user equipment, and a configuration process of the priority is based on the first embodiment and similar to the process of configuring the priority information described in FIG. 3.

Optionally or further, the processor 32 determining the network overload state includes that the processor 32 may determine the network overload state according to an idle state of network resources.

For example, if the processor 32 determines that an idle network resource exists, the processor 32 determines that the network is not overloaded, and if the processor 32 determines that no idle network resource exists, the processor 32 determines that the network is overloaded.

Optionally, the processor 32 may determine the network overload state according to a network overload control command.

For example, if the processor 32 determines that the network overload control command is received, the processor 32 determines that the network is overloaded, and if the processor 32 determines that no network overload control command is received, the processor 32 determines that the network is not overloaded.

It can be understood that, the network overload control command can be triggered when a device operator or manufacturer maintains a device or be triggered when a device is faulty.

Further, the processor 32 controlling the connection between the user equipment and a network according to the priority of the network connection request and the network overload state includes that the processor 32 rejects the network connection request of the user equipment according to that the priority of the network connection request is a low priority and the network is overloaded, and sends, to the user equipment, a rejecting message carrying a back-off time, and the processor 32 does not receive, in the back-off time, the network connection request having a low priority sent by the user equipment.

Optionally, if the processor 32 determines that the priority of the network connection request is a low priority or a non-low priority, and determines that the network is not overloaded, the MME 30 controls the user equipment to establish a network connection having a low priority or a non-low priority.

Optionally, after the processor 32 determines that the priority of the network connection request is a low priority, determines that the network is overloaded, rejects the network connection request having a low priority, and sends, to the user equipment, the rejecting message carrying the back-off time, the processor 32, in the back-off time, receives a second network connection request sent by the user equipment, sends a timing stop message to the user equipment if a priority of the second network connection request is a non-low priority, and controls establishment of a connection having a non-low priority between the user equipment and the network.

After the processor 32 determines that the user equipment meets a condition of establishing the connection having a non-low priority to the network, that the controlling establishment of a connection having a non-low priority between the user equipment and the network includes that the processor 32 controls the user equipment to establish a public bearer having a non-low priority or a public PDN connection having a non-low priority according to a connection request having a non-low priority of the user equipment if the processor 32 determines, according to subscription information of the user equipment, that the user equipment belongs to a preset user equipment group.

Optionally, if the processor 32 determines, according to subscription information of the user equipment, that the user equipment does not belong to a preset user equipment group, the processor 32 controls the user equipment to establish a single bearer having a non-low priority or a single PDN connection having a non-low priority to the network. In this embodiment, the process in which the processor 32 controls the user equipment to establish a network connection is similar to that in the first embodiment, and is not described herein again.

It can be understood that, if the user equipment supports multiple PDN connections, the priority information may further include different APNs. The processor 32 identifies connection requests having different priorities according to different APN values. For example, APN1 indicates a connection request having a low priority, and APN2 indicates a connection request having a non-low priority. The processor 32 may determine a priority of a connection request according to the APN value.

It can be understood that, for the user equipment supporting a single PDN connection, an existing PDN connection needs to be deleted and a new PDN connection needs to be re-established before a new PDN connection request is initiated. A specific process in which the PDN connection is deleted is a technology known by a person skilled in the art, does not affect clear descriptions of the main technical solution in the embodiment of the present disclosure, and is not described herein again.

It can be understood that, the processor 32 may also predefine a limit value for the user equipment that may establish a network connection having a non-low priority. When the processor 32 determines that the user equipment establishing the network connection having a non-low priority exceeds the limit value, whether the network is overloaded or not, the processor 32 rejects the connection request having a non-low priority sent by the user equipment.

It can be further understood that, for the user equipment belonging to the preset user equipment group, the processor 32 may further set a limit value for the number of user equipment belonging to the preset user equipment group and establishing connections having a non-low priority to the network. When the processor 32 determines that the number of the user equipment establishing connections having a non-low priority to the network and in the preset user equipment group exceeds the limit value, the processor 32 rejects the connection request having a non-low priority sent by the user equipment. The processor 32 protects the network by controlling the number of the user equipment establishing network connections, which avoids network paralysis caused by occupancy of network resources by unlimitedly establishing the network connections having a non-low priority by multiple user equipment.

It can be further understood that, an order in which the processor 32 determines the priority of the network connection request and determines the network overload state is not limited.

In this embodiment, the MME 30 may further include a memory 34, and the memory 34 may be configured to store an uplink control instruction or data information sent by an user equipment, and store uplink and downlink control signaling and data information between the MME 30 and the S-GW or between the MME 30 and the P-GW. The memory 34 may be integrated with the HSS.

According to the embodiment of the present disclosure, the MME 30 may selectively control the connection between the user equipment and the network by determining the priority of the network connection request and the network overload state.

Figure 8:
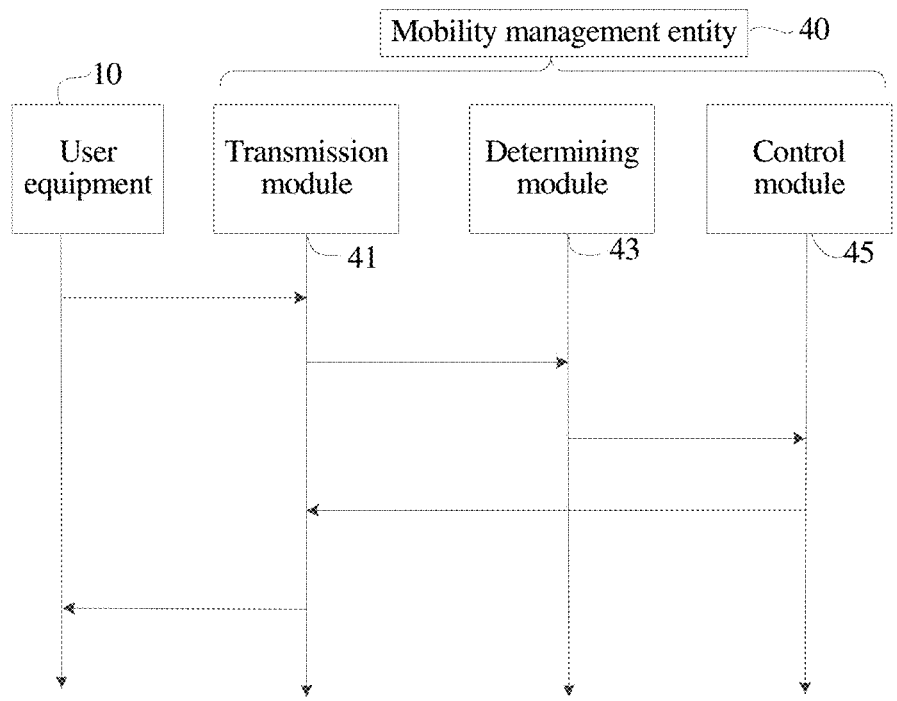
FIG. 8 is a schematic diagram of an MME that controls a connection between a user equipment and a network according to a third embodiment of the present disclosure.

FIG. 8 is a schematic diagram of an MME that controls a connection between a user equipment and a network according to a third embodiment of the present disclosure.

A technical solution of this embodiment is further described based on the technical solution described in the first embodiment of the present disclosure. An MME 40 includes a transmission module 41, a determining module 43, and a control module 45.

The transmission module 41 receives a network connection request sent by a user equipment 10.

The determining module 43 determines a priority of the network connection request and a network overload state.

The control module 45 controls a connection between the user equipment 10 and the network according to the priority of the network connection request and the network overload state.

According to the embodiment of the present disclosure, the MME 40 may selectively control the connection between the user equipment 10 and the network by determining the priority of the network connection request and the network overload state.

The transmission module 41 receives a network connection request which carries priority information sent by the user equipment 10, where the priority information indicates the priority of the network connection request, or receives a network connection request which does not carry priority information and is sent by the user equipment 10.

The priority information may indicate that the priority of the network connection request is a low priority or a non-low priority. In other embodiments, the non-low priority may further include multiple levels, such as a medium priority and a high priority. The priority information is preconfigured in the user equipment 10, and a configuration process of the priority is based on the first embodiment and similar to the process of configuring the priority information described in FIG. 3.

The determining module 43 determining the priority of the network connection request includes that the determining module 43 determines whether the network connection request carries the priority information, the priority of the network connection request is determined according to the priority information if priority information is carried, and it is determined that the priority of the network connection request is a non-low priority if the priority information is not carried.

Optionally or further, the determining module 43 determining the network overload state includes that the determining module 43 may determine the network overload state according to an idle state of network resources.

For example, the determining module 43 determines that the network is not overloaded if the determining module 43 determines that an idle network resource exists, and the determining module 43 determines that the network is overloaded if the determining module 43 determines that no idle network resource exists.

Optionally, the determining module 43 may determine the network overload state according to a network overload control command.

For example, the determining module 43 determines that the network is overloaded if the determining module 43 determines that the network overload control command is received, and the determining module 43 determines that the network is not overloaded if the determining module 43 determines that no network overload control command is received.

It can be understood that, the network overload control command can be triggered when a device operator or manufacturer maintains a device or be triggered when a device is faulty.

Further, the control module 45 controlling the connection between the user equipment 10 and the network according to the priority of the network connection request and the network overload state includes that the control module 45 rejects the network connection request of the user equipment 10 according to that the priority of the network connection request is a low priority and the network is overloaded, and sends, to the user equipment 10, a rejecting message carrying a back-off time, and the control module 45 does not receive, in the back-off time, the network connection request having a low priority sent by the user equipment 10.

Optionally, the control module 45 controls the user equipment 10 to establish a network connection with a low priority or a non-low priority if the control module 45 determines that the priority of the network connection request is a low priority or a non-low priority, and determines that the network is not overloaded.

Optionally, after the control module 45 determines that the priority of the network connection request is a low priority, determines that the network is overloaded, rejects the network connection request having a low priority and sends, to the user equipment 10, the rejecting message carrying the back-off time, the control module 45, in the back-off time, receives a second network connection request sent by the user equipment 10, sends a timing stop message to the user equipment 10 if a priority of the second network connection request is a non-low priority, the control module 45, and controls establishment of a connection having a non-low priority between the user equipment 10 and the network.

After the control module 45 determines that the user equipment 10 meets a condition of establishing the connection having a non-low priority to the network, the controlling establishment of a connection having a non-low priority between the user equipment 10 and the network includes that the control module 45 controls the user equipment 10 to establish a public bearer having a non-low priority or a public PDN connection having a non-low priority according to a connection request having a non-low priority of the user equipment 10 if the control module 45 determines, according to subscription information of the user equipment 10, that the user equipment 10 belongs to a preset user equipment group.

Optionally, if the control module 45 determines, according to subscription information of the user equipment 10, that the user equipment 10 does not belong to a preset user equipment group, the control module 45 controls the user equipment 10 to establish a single bearer having a non-low priority or a single PDN connection having a non-low priority to the network. In this embodiment, the process in which the control module 45 controls the user equipment 10 to establish a network connection is similar to that in the first embodiment, and is not described herein again.

It can be understood that, if the user equipment 10 supports multiple PDN connections, the priority information may further include different. The control module 45 identifies connection requests having different priorities according to different APN values. For example, APN1 indicates a connection request having a low priority, and APN2 indicates a connection request having a non-low priority. The control module 45 may determine a priority of a connection request according to the APN value.

It can be understood that, for the user equipment 10 supporting the single PDN connection, an existing PDN connection needs to be deleted and a new PDN connection needs to be established before a new PDN connection request is initiated. A specific process in which the PDN connection is deleted is a technology known by a person skilled in the art, does not affect clear descriptions of the main technical solution in the embodiment of the present disclosure, and is not described herein again.

It can be understood that, the control module 45 may also predefine a limit value for the user equipment 10 that may establish a network connection having a non-low priority. When the control module 45 determines that the user equipment 10 establishing the network connection having a non-low priority exceeds the limit value, whether the network is overloaded or not, the control module 45 rejects the connection request having a non-low priority sent by the user equipment 10.

It can be further understood that, for the user equipment 10 belonging to the preset user equipment group, the control module 45 may further set a limit value for the number of user equipment belonging to the preset user equipment group and establishing connections having a non-low priority to the network. When the control module 45 determines that the number of the user equipment establishing connections having a non-low priority to the network and in the preset user equipment group exceeds the limit value, the control module 45 rejects the connection request having a non-low priority sent by the user equipment 10. The control module 45 protects the network by controlling the number of the user equipment establishing network connections, which avoids network paralysis caused by occupancy of network resources by unlimitedly establishing the network connections having a non-low priority by multiple user equipment.

It can be further understood that, an order in which the control module 45 determines the priority of the network connection request and determines the network overload state is not limited.

According to the embodiment of the present disclosure, the MME 40 may selectively control the connection between the user equipment 10 and the network by determining the priority of the network connection request and the network overload state.

Figure 9:
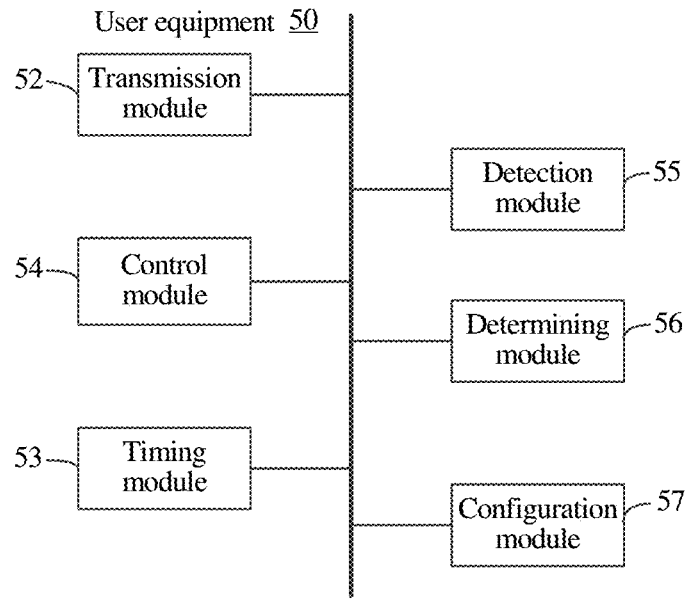
FIG. 9 is a structural diagram of a user equipment that controls a connection to a network according to a fourth embodiment of the present disclosure.

FIG. 9 is a structural diagram of a user equipment 50 that controls a connection to a network according to a fourth embodiment of the present disclosure.

The user equipment 50 in the embodiment of the present disclosure may be an M2M device, for example, a fixed or mobile M2M communications device such as a temperature tester, or a water/electricity meter.

The user equipment 50 includes a transmission module 52, a timing module 53, and a control module 54, where the transmission module 52 sends a network connection request to an MME. The transmission module 52 receives a rejecting message which carries a back-off time and is sent by the MME. The timing module 53 starts a timer according to the back-off time in the rejecting message, and the control module 54, in the back-off time, forbids the user equipment 50 to send a network connection request having a low priority, and allows the user equipment 50 to send a network connection request having a non-low priority.

The user equipment 50 in the embodiment of the present disclosure, according to the rejecting message sent by the MME, forbids the user equipment 50 to send the network connection request having a low priority, and allows the user equipment 50 to send the network connection request having a non-low priority, which prevents the user equipment 50 from continuously sending network connection requests having a low priority to a network, and avoids blocking the network.

The transmission module 52 sending the network connection request to the MME includes that the transmission module 52 may send, to the MME, a network connection request which carries priority information, or send, to the MME, a network connection request which does not carry priority information.

It can be understood that, if the network connection request does not carry the priority information, the MME may determine that the default priority of the network connection request is a non-low priority.

It can be understood that, when the user equipment 50 acquires service data having a non-low priority, the control module 54, in the back-off time, controls the user equipment 50 to send a network connection request having a non-low priority to the MME, and stops timing of the timer according to timing stop signaling sent for the network connection request having a non-low priority by the MME.

The user equipment 50 in the embodiment of the present disclosure may further include a detection module 55, a determining module 56, and a configuration module 57, where the detection module 55 is configured to detect and acquire service data, such as temperature data and water/electricity data.

The determining module 56 determines a priority of the service data acquired by the detection module 55.

The configuration module 57 configures priority information corresponding to the priority of the service data.

For specific solutions executed by the determining module 56 and the configuration module 57, refer to the descriptions in the first embodiment, which are not described herein again. The user equipment 50 in the embodiment of the present disclosure, according to the rejecting message sent by the MME, forbids the user equipment 50 to send network connection request having a low priority, and allows the user equipment 50 to send network connection request having a non-low priority, which prevents the user equipment 50 from continuously sending network connection requests having a low priority to a network, and avoids blocking the network.

Figure 10:
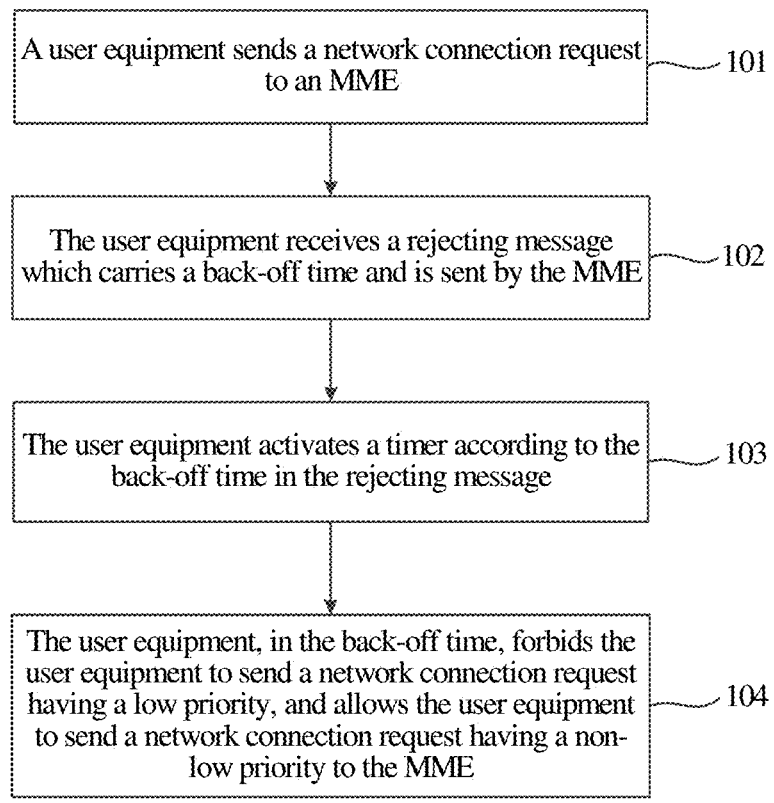
FIG. 10 is a flowchart diagram of a method for controlling a connection between a user equipment and a network according to a fifth embodiment of the present disclosure.

FIG. 10 is a flowchart of a method for controlling a connection between a user equipment and a network according to a fifth embodiment of the present disclosure.

The method for controlling the connection between a user equipment and the network includes the following steps.

Step 101: A user equipment sends a network connection request to an MME 60.

Step 102: The user equipment receives a rejecting message which carries a back-off time and is sent by the MME.

Step 103: The user equipment activates a timer according to the back-off time in the rejecting message.

Step 104: The user equipment, in the back-off time, forbids the user equipment to send a network connection request having a low priority, and allows the user equipment to send a network connection request having a non-low priority to the MME.

According to the method for controlling the connection between the user equipment and the network in the embodiment of the present disclosure, the user equipment is, according to the rejecting message sent by the MME, forbidden to send the network connection request having a low priority, and allowed to send the network connection request having a non-low priority, which prevents the user equipment from continuously sending network connection requests having a low priority to a network, and avoids blocking the network.

In step 101, the user equipment may send, to the MME, a network connection request which carries priority information, or send, to the MME, a network connection request which does not carry priority information.

In step 104, that the user equipment is allowed to send the network connection request having a non-low priority to the MME in the back-off time includes that in the back-off time, when the user equipment acquires the service data having a non-low priority, the user equipment sends the network connection request having a non-low priority to the MME.

Further, after the user equipment controls, in the back-off time, the user equipment to send the network connection request having a non-low priority to the MME, the method further includes that the user equipment stops timing of the timer according to timing stop signaling sent for the network connection request having a non-low priority by the MME.

According to the method for controlling the connection between the user equipment and the network in this embodiment, the user equipment is, according to the rejecting message sent by the MME, forbidden to send the network connection request having a low priority, and allowed to send the network connection request having a non-low priority, which may selectively control the connection between the user equipment and the network.

It should be understood by a person of ordinary skill in the art that exemplary modules and algorithm steps described with reference to the disclosed embodiments of this specification may be implemented by means of electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should be considered that the implementation does not go beyond the scope of the present disclosure.

It should be clearly understood by a person skilled in the art that for ease and brevity of description, reference may be made to corresponding processes in the foregoing method embodiments for the specific working processes of the electronic devices, devices, and modules described above, which are not described herein again.

In several embodiments provided in this application, it should be understood that, the disclosed system, device, and method may be implemented in other manners. The electronic device embodiments described above are merely exemplary, for example, the division of the modules is merely division according to logical functions, and another division manner may be available when actual implementation is performed.

In addition, various function modules in the embodiments of the present disclosure may be integrated in one processing device, or modules may exist physically independently, or two or more than two modules may be integrated in one device.

When the function is implemented in a software function device form and is sold or used as an independent product, the function may be stored in a computer readable storage medium. Based on such an understanding, the technical solutions of the present disclosure essentially, or the part contributing to other approaches, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for controlling a connection between a user equipment and a network, wherein the method is implemented by a mobility management entity, and wherein the method comprises:
receiving a network connection request from the user equipment;
determining a number of user equipment connections to the network having a non-low priority;
determining a priority of the network connection request and a network overload state by:
determining that the priority of the network connection request is the non-low priority when the network connection request carries priority information indicating that the priority of the network connection request is the non-low priority; and
determining that the network overload state is not overloaded; and
controlling the connection between the user equipment and the network according to the priority of the network connection request and the network overload state by rejecting the network connection request when determining that the number of user equipment connections to the network having the non-low priority exceeds a predefined limit value, that the priority of the network connection request is the non-low priority, and that the network overload state is not overloaded.

2. The method of claim 1, wherein controlling the connection between the user equipment and the network comprises:
rejecting the network connection request when the priority of the network connection request is a low priority and the network is overloaded; and
sending, to the user equipment, a rejection message comprising a back-off time.

3. The method of claim 2, wherein after sending the rejection message comprising the back-off time, the method further comprises:
receiving, within the back-off time, a second network connection request from the user equipment; and
controlling establishment of a non-low priority connection between the user equipment and the network when the mobility management entity determines that a priority of the second network connection request is the non-low priority.

4. The method of claim 3, wherein controlling establishment of the non-low priority connection comprises controlling establishment of a non-low priority bearer between the user equipment and the network when the mobility management entity determines, according to subscription information of the user equipment, that the user equipment does not belong to a preset user equipment group.

5. The method of claim 3, wherein controlling establishment of the non-low priority connection comprises controlling establishment of a non-low priority packet data network (PDN) connection between the user equipment and the network when determining, according to subscription information of the user equipment, that the user equipment does not belong to a preset user equipment group.

6. The method of claim 3, wherein controlling the connection between the user equipment and the network comprises controlling establishment of a non-low priority public bearer between the user equipment and the network when the mobility management entity determines, according to subscription information of the user equipment, that the user equipment belongs to a preset user equipment group.

7. The method of claim 3, wherein controlling the connection between the user equipment and the network comprises controlling establishment of a non-low priority public packet data network (PDN) connection between the user equipment and the network when determining, according to subscription information of the user equipment, that the user equipment belongs to a preset user equipment group.

8. The method of claim 1, wherein controlling the connection between the user equipment and the network comprises controlling establishment of a connection comprising a corresponding priority between the user equipment and the network when the network is not overloaded and the priority of the network connection request is a low priority or the non-low priority.

9. The method of claim 1, wherein determining the network overload state comprises determining the network overload state according to an idle state of network resources.

10. The method of claim 1, wherein determining the network overload state comprises determining the network overload state according to a network overload control command.

11. The method of claim 1, wherein the priority information comprises a parameter value in service data of the network connection request.

12. A mobility management entity, comprising:
a transceiver configured to receive a network connection request from a user equipment; and
a processor coupled to the transceiver and configured to:
determine a number of user equipment connections to a network having a non-low priority;
determine a priority of the network connection request and a network overload by:
determining that the priority of the network connection request is the non-low priority when the network connection request carries priority information indicating that the priority of a network connection is the non-low priority; and
determining that the network overload state is not overloaded; and
control a connection between the user equipment and the network according to the priority of the network connection request and the network overload state by rejecting the network connection request when determining that the number of user equipment connections to the network having the non-low priority exceeds a predefined limit value, that the priority of the network connection request is the non-low priority, and that the network overload state is not overloaded.

13. The mobility management entity of claim 12, wherein the processor is further configured to reject the network connection request when the priority of the network connection request is a low priority and the network is overloaded, and wherein the transceiver is further configured to send, to the user equipment, a rejection message carrying a back-off time.

14. The mobility management entity of claim 13, wherein after the transceiver sends the rejection message, the transceiver is further configured to receive, within the back-off time, a second network connection request from the user equipment, and wherein the processor is further configured to:
determine that a priority of the second network connection request is the non-low priority; and
control establishment of a non-low priority connection between the user equipment and the network.

15. A computer program product comprising instructions stored on a non-transitory computer-readable medium that, when executed by a processor, cause a mobility management entity to:
receive a network connection request from a user equipment;
determine a number of user equipment connections to a network having a non-low priority;
determine a priority of the network connection request and a network overload state by:
determining that the priority of the network connection request is the non-low priority when the network connection request carries priority information indicating that the priority of the network connection request is the non-low priority; and
determining that the network overload state is not overloaded; and
control a connection between the user equipment and the network according to the priority of the network connection request and the network overload state by rejecting the network connection request when determining that the number of user equipment connections to the network having the non-low priority exceeds a predefined limit value, that the priority of the network connection request is the non-low priority, and that the network overload state is not overloaded.

16. The computer program product of claim 15, wherein controlling the connection between the user equipment and the network comprises:
rejecting the network connection request when the priority of the network connection request is a low priority and the network is overloaded; and
sending, to the user equipment, a rejection message comprising a back-off time.

17. The computer program product of claim 16, wherein after sending the rejection message comprising the back-off time, the instructions further cause the mobility management entity to:
receive, within the back-off time, a second network connection request from the user equipment; and
control establishment of a non-low priority connection between the user equipment and the network when the mobility management entity determines that a priority of the second network connection request is the non-low priority.

18. The computer program product of claim 17, wherein controlling establishment of the non-low priority connection comprises controlling establishment of a non-low priority bearer between the user equipment and the network when the mobility management entity determines, according to subscription information of the user equipment, that the user equipment does not belong to a preset user equipment group.

19. The computer program product of claim 17, wherein controlling establishment of the non-low priority connection comprises controlling establishment of a non-low priority packet data network (PDN) connection between the user equipment and the network when determining, according to subscription information of the user equipment, that the user equipment does not belong to a preset user equipment group.

20. The computer program product of claim 17, wherein controlling the connection between the user equipment and the network comprises controlling establishment of a non-low priority public bearer between the user equipment and the network when the mobility management entity determines, according to subscription information of the user equipment, that the user equipment belongs to a preset user equipment group.

* * * * *